(12) United States Patent
Liu et al.

(10) Patent No.: US 9,612,468 B1
(45) Date of Patent: Apr. 4, 2017

(54) DISPLAY APPARATUS

(71) Applicant: Young Lighting Technology Inc., Hsin-Chu (TW)

(72) Inventors: Chin-Ku Liu, Hsin-Chu (TW); Huai-Chung Hsu, Hsin-Chu (TW); Yu-Ting Lin, Hsin-Chu (TW); Jhong-Hao Wu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 15/168,099

(22) Filed: May 30, 2016

(30) Foreign Application Priority Data

Nov. 6, 2015 (TW) .............................. 104136596 A (51) Int. Cl.
| | |
|---|---|
| *G02B 27/10* | (2006.01) |
| *G02F 1/1333* | (2006.01) |
| *G02B 27/14* | (2006.01) |
| *G02F 1/1335* | (2006.01) |

(52) U.S. Cl.
CPC ..... *G02F 1/13336* (2013.01); *G02B 27/1066* (2013.01); *G02B 27/144* (2013.01); *G02F 1/133555* (2013.01)

(58) Field of Classification Search
CPC .......... G02F 1/13336; G02F 1/133555; G02B 27/1066; G02B 27/144; G02B 27/10
See application file for complete search history.

(56) References Cited

U.S. PATENT DOCUMENTS

| | | | |
|---|---|---|---|
| 7,554,628 B2* | 6/2009 | Mitani | ................ G02F 1/13336 349/112 |
| 2004/0071417 A1 | 4/2004 | Veligdan | |
| 2005/0248961 A1 | 11/2005 | Kazuhiro et al. | |
| 2010/0238090 A1 | 9/2010 | Pomerantz et al. | |
| 2010/0259566 A1 | 10/2010 | Watanabe | |

(Continued)

FOREIGN PATENT DOCUMENTS

| | | |
|---|---|---|
| CN | 101206327 | 6/2008 |
| CN | 101593473 | 12/2009 |

(Continued)

OTHER PUBLICATIONS

"Search Report of Europe Counterpart Application", issued on Dec. 15, 2016, p. 1-p. 5.

(Continued)

*Primary Examiner* — Joseph P Martinez
(74) *Attorney, Agent, or Firm* — Jianq Chyun IP Office (57) ABSTRACT

A display apparatus including a display device, a first prism and a second prism is provided. A part of a light beam from a display area of the display device that is covered by a first light entering surface of the first prism penetrates the first light entering surface and is sequentially refracted by a reflective refractive surface of the first prism to above the display area. Another part of the light beam from the display area that is covered by the first light entering surface penetrates the first light entering surface, is reflected by the reflective refractive surface, penetrates a first light exiting surface of the first prism, a gap, a second light entering surface of the second prism and a second light exiting surface of the second prism sequentially, and is transmitted to above a frame area of the display device.

24 Claims, 7 Drawing Sheets

(56) References Cited

U.S. PATENT DOCUMENTS

2015/0091833 A1 4/2015 Wu
2015/0116852 A1 4/2015 Kim et al.

FOREIGN PATENT DOCUMENTS

| CN | 102854644 | 1/2013 |
|----|-----------|--------|
| CN | 202794587 U | 3/2013 |
| CN | 203882090 | 10/2014 |
| CN | 103700323 | 12/2015 |
| JP | S60242424 | 12/1985 |
| JP | 2008060061 | 3/2008 |
| TW | 201432331 | 8/2014 |
| TW | 201512740 | 4/2015 |
| TW | 201513069 | 4/2015 |
| TW | 201513070 A | 4/2015 |
| WO | 2013055852 | 4/2013 |

OTHER PUBLICATIONS

"Office Action of Taiwan Counterpart Application", issued on Jul. 19, 2016, p. 1-p. 3.

* cited by examiner

DISPLAY APPARATUS

CROSS-REFERENCE TO RELATED APPLICATION

This application claims the priority benefit of Taiwan application serial no. 104136596, filed on Nov. 6, 2015. The entirety of the above-mentioned patent application is hereby incorporated by reference herein and made a part of this specification.

BACKGROUND OF THE INVENTION

Field of the Invention

The invention relates to a display apparatus.

Description of Related Art

Large screen display system is widely used in the control room in many fields, such as telecommunication management network, direction guidance by traffic police, traffic monitoring and management, command in military combat training, industrial production control, etc., it can display a variety of signals from different signal sources and can satisfy the requirements about displaying a variety of shared information and general information in a big area of the user. Otherwise, the application that a plurality of screens are spliced together to achieve a larger display screen is also applied in many fields. Recently, in order to achieve a large screen display system or a general display screen splicing, the common way is that a plurality of liquid crystal displays (LCDs) are adopted to be display units and to be spliced together.

The liquid crystal display is the mainstream display after years of development. The advantages of the liquid crystal display are thin, light weight, low power consumption, long lifespan, non-radiation, and the display screen of the liquid crystal display is exquisite and high resolution, otherwise, each of key performance indicators of the liquid crystal display is outstanding. However, although the liquid crystal display has the advantages as mentioned above, it is very difficult to avoid the non-effective region and the front frame structure of the liquid crystal display panel based on the principle of operation of the liquid crystal display. Therefore, when the LCDs are adopted to achieve splicing many display screens, there are frames existing between the display screens of the LCDs so as to result in the overall displayed image not being continuous and to affect the ornamental quality.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a display apparatus which can achieve a borderless display effect.

Other objects and advantages of the invention can be further illustrated by the technical features broadly embodied and described as follows.

In order to achieve one or a portion of or all of the objects or other objects, one embodiment of the invention provides a display apparatus. The display apparatus includes a display device, a first prism and a second prism. The display device has a display area and a frame area surrounding the display area. The first prism is disposed on an edge area of the display area, and has a first light entering surface facing the display area, a reflective refractive surface inclined with respect to the display area, and a first light exiting surface connecting the first light entering surface and the reflective refractive surface. The second prism is disposed beside the first prism and located above the frame area. The second prism has a second light entering surface facing the first light exiting surface and a second light exiting surface located above and facing away from the frame area. The first light exiting surface and the second light entering surface have a gap therebetween. A part of light beam from an area of the display area that is covered by the first light entering surface penetrates the first light entering surface and is sequentially refracted by the reflective refractive surface to above the display area. Another part of the light beam from the area of the display area that is covered by the first light entering surface penetrates the first light entering surface, is reflected by the reflective refractive surface, penetrates the first light exiting surface, the gap, the second light entering surface and the second light exiting surface sequentially, and is transmitted to above the frame area.

In order to achieve one or a portion of or all of the objects or other objects, one embodiment of the invention provides a display apparatus. The display apparatus includes a display device, a first prism and a second prism. The display device has a display area and a frame area surrounding the display area. The first prism is disposed on an edge area of the display area, and has a first light entering surface facing the display area, a reflective refractive surface inclined with respect to the display area, and a first light exiting surface connecting the first light entering surface and the reflective refractive surface. The second prism is disposed beside the first prism and located above the frame area. The second prism has a second light entering surface facing the first light exiting surface, a second light exiting surface located above and facing away from the frame area, and an inclined surface connecting the second light entering surface and the second light exiting surface. The first light exiting surface and the second light entering surface have a gap therebetween and face each other.

Based on the above, the embodiments of the invention have at least one of the advantages or effects below. In display apparatus of the embodiments of the invention, the second prism is disposed beside the first prism and located above the frame area of the display device. Besides, the part of the light beam from the area of the display area that is covered by the first light entering surface sequentially penetrates the first light entering surface, is reflected by the reflective refractive surface, penetrates the first light exiting surface, the gap, the second light entering surface and the second light exiting surface sequentially, and is transmitted to above the frame area. Therefore, the display apparatus can achieve a borderless display effect. Moreover, because a design having the inclined angle of the first prism, the gap between the first prism and the second prism, or the reflecting element, when the viewer at a side of the first prism watches the display apparatus at a larger viewing angle, the viewer still sees the displayed image and does not see the frame of the display apparatus, so as to improve the display effect of the displayed image at a large viewing angle.

Other objectives, features and advantages of the present invention will be further understood from the further technological features disclosed by the embodiments of the

DESCRIPTION OF THE EMBODIMENTS

In the following detailed description of the preferred embodiments, reference is made to the accompanying drawings which a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited besides, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
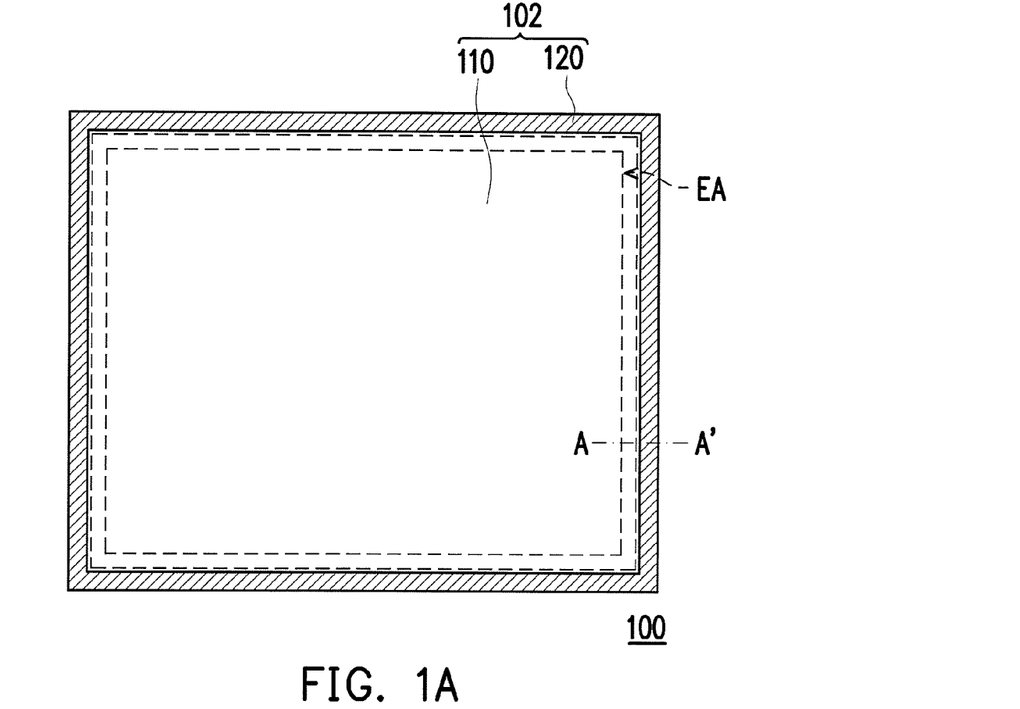
FIG. 1A is a schematic top view depicting a display apparatus of an embodiment of the invention.

FIG. 1A is a schematic top view depicting a display apparatus of an embodiment of the invention. Referring to FIG. 1A, a display apparatus 100 of the embodiment includes a display device 102. The display device 102 has a display area 110 and a frame area 120 surrounding the display area 110. In detail, the display device 102 is, for example, a liquid crystal display (LCD). The display area 110 has a plurality of pixels (not shown) to show a displayed image, and the frame area 120 is a non-display area of the display device 102. In some embodiments, the display device 102 may also be other types of displays, such as an organic light emitting display (OLED), etc., but the invention is not limited thereto.

Figure 1B:
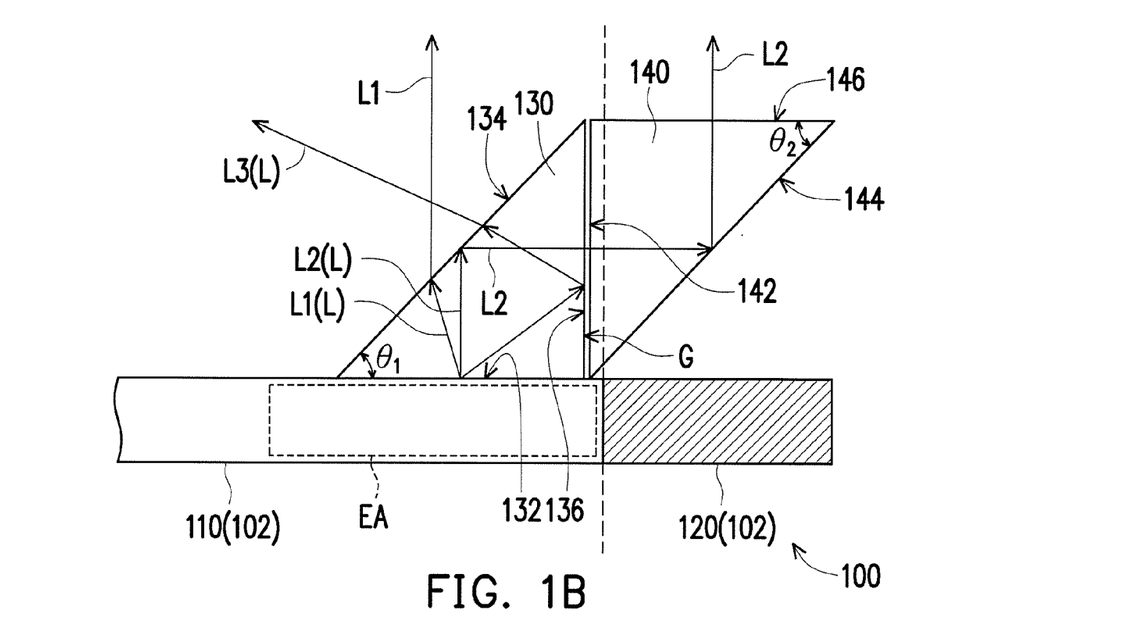
FIG. 1B is a partial cross-sectional view depicting a junction of a display area and a frame area (along a line A-A') of the display apparatus of the embodiment in FIG. 1A.

FIG. 1B is a partial cross-sectional view depicting a junction of the display area and the frame area (along a line A-A') of the display apparatus of the embodiment in FIG. 1A. Referring to FIG. 1A and FIG. 1B, the display area 110 of the embodiment has an edge area EA. The edge area EA is an area of the display area 110 that is close to the frame area 120. In detail, the display apparatus 100 further include a first prism 130 and a second prism 140, wherein the first prism 130 and the second prism 140 are, for example, made of a transparent material, such as polymethylmethacrylate (PMMA), polycarbonate (PC), or glass, and the invention is not limited thereto. The first prism 130 is disposed on an edge area EA of the display area 110, and the second prism 140 is disposed beside the first prism 130 and located above the frame area 120. In the embodiment, the first prism 130 has a first light entering surface 132, a reflective refractive surface 134, and a first light exiting surface 136. The first light exiting surface 136 connects the first light entering surface 132 and the reflective refractive surface 134. The first light entering surface 132 faces the display area 110, and the reflective refractive surface 134 is inclined with respect to the display area 110. The second prism 140 has a second light entering surface 142 and a second light exiting surface 146. The second light entering surface 142 faces the first light exiting surface 136 of the first prism 130, and the second light exiting surface 146 is located above and facing away from the frame area 120. In detail, the second prism 140 further has an inclined surface 144 that is inclined with respect to the surface of the display area 110, and the inclined surface 144 connects the second light entering surface 142 and the second light exiting surface 146.

Referring to FIG. 1B, in the embodiment, the first light exiting surface 136 of the first prism 130 and the second light entering surface 142 of the second prism 140 are adjacent to each other and facing each other, and the first light exiting surface 136 and the second light entering surface 142 have a gap G therebetween. In detail, the first prism 130 of the embodiment is located above the display area 110, and a part of the second prism 140 is located above the display area 110, and the other part of the second prism 140 is located above the frame area 120. The gap G between the first prism 130 and the second prism 140 is located above the display area 110 (within the coverage of the display area 110). Besides, in some embodiments, the gap G may be aligned with the junction of the display area 110 and the frame area 120. In the embodiment, the first prism 130 may be, for example, directly placed on the edge area EA of the display area 110 in a way that the first light entering surface 132 faces downward, or the first prism 130 may also be adhered and fixed to the edge area EA of the display area 110 in a way that the first light entering surface 132 faces downward. In addition, the second prism 140 may be fixed by a mechanical member or other supporting structures, so that the second prism 140 is configured to be adjacent to the first prism 130 and the second light entering surface 142 faces the first light exiting surface 136 of the first prism 130. Moreover, the gap G between the first prism 130 and the second prism 140 may be, for example, an air gap, a gas gap, or a vacuum gap, and the invention is not limited thereto.

Referring to FIG. 1B, in the present embodiment, the area of the display area 110 that is covered by the first light entering surface 132 emits a light beam L. In detail, the light beam L, for example, penetrate the pixels of the display area 110 and is emitted from the surface of the display area 110 that faces the first prism 130. In the embodiment, the light beam L includes a light beam L1 and a light beam L2. The light beam L1 (i.e. a part of the light beam L) sequentially penetrate the first light entering surface 132 and the reflective refractive surface 134, and is then transmitted to above the display area 110. In detail, the light beam L1 is refracted at the reflective refractive surface 134 and departs from the first prism 130 after the light beam L1 penetrates the first light entering surface 132. Besides, the light beam L2 (another part of the light beam L) sequentially penetrates the first light entering surface 132, is reflected by the reflective refractive surface 134, penetrates the first light exiting surface 136, the gap G, and the second light entering surface 142 and the second light exiting surface 146 of the second prism 140 sequentially, and is transmitted to above the frame area 120. In the embodiment, the inclined surface 144 of the second prism 140 reflects at least a part of the light beam L2 from the second light entering surface 142 to the second light exiting surface 146. In detail, after the light beam L2 enters the first prism 130 via the first light entering surface 132, the incident angle of the light beam L2 on the reflective refractive surface 134 is greater than the critical angle, so as to generate total reflection. The light beam L2 is totally reflected by the reflective refractive surface 134 towards the first light exiting surface 136. Subsequently, the light beam L2 is also totally reflected by the inclined surface 144 after the light beam L2 penetrates the first light exiting surface 136, the gap G, and the second light entering surface 142 of the second prism 140. The light beam L2 is totally reflected by the inclined surface 144 to the second light exiting surface 146. Besides, in the embodiment, the light beam L further includes a light beam L3 emitted toward the first light exiting surface 136. The light beam L3 is totally reflected by the first light exiting surface 136 towards the reflective refractive surface 134, and emitted from the reflective refractive surface 134. Furthermore, the refractive index of the first prism 130 is greater than the refractive index of the gap G, the light beam L3 is easy to be totally reflected by the first light exiting surface 136 to the reflective refractive surface 134, and to be emitted from the reflective refractive surface 134.

In the embodiment, the reflective refractive surface 134 of the first prism 130 has an inclined angle $\theta_1$ with respect to the surface of the display area 110 of the display device 102. The inclined angle $\theta_1$ is in a range of 10-80 degrees. Preferably, the inclined angle $\theta_1$ is in a range of 30-60 degrees. More preferably, the inclined angle $\theta_1$ is in a range of 35-45 degrees. Besides, the inclined surface 144 of the second prism 140 has an inclined angle $\theta_2$ with respect to the surface of the display area 110 of the display device 102. The inclined angle $\theta_2$ is in a range of 10-80 degrees. Preferably, the inclined angle $\theta_2$ is in a range of 30-60 degrees. More preferably, the inclined angle $\theta_2$ is in a range of 40-45 degrees.

Figure 1C:
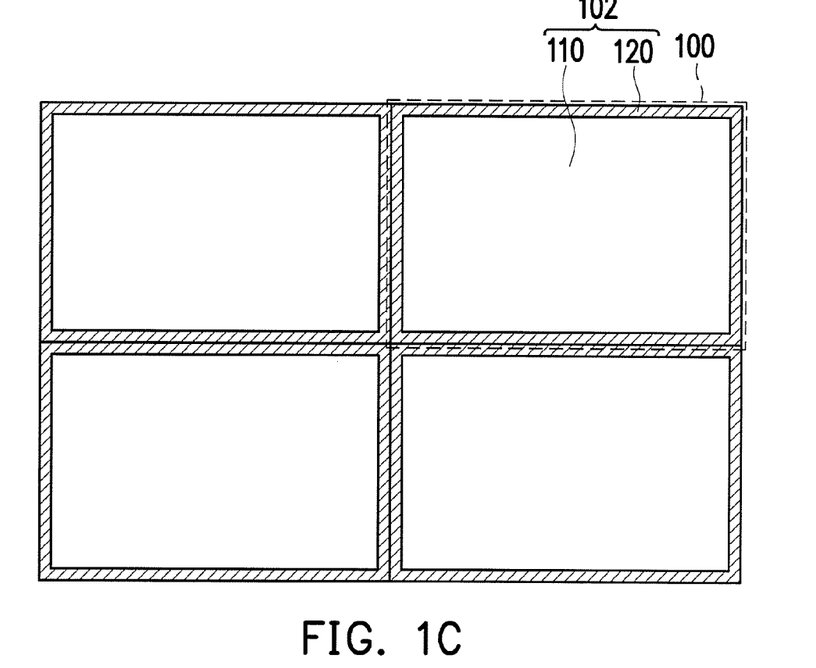
FIG. 1C is a schematic top view depicting a plurality of display apparatuses of the embodiment in FIG. 1A being spliced together according to one embodiment of the invention.

FIG. 1C is a schematic top view depicting a plurality of display apparatuses of the embodiment in FIG. 1A being spliced together according to one embodiment of the invention. Referring to FIG. 1B and FIG. 1C, in the embodiment, four display apparatuses 100 are spliced to each other by the way of 2×2, so as to achieve an effect that a larger image is displayed. However, in some embodiments, other types of the display apparatuses may also be adopted and spliced, and other ways of splicing the display apparatuses may be adopted, and the invention is not limited thereto. In each of display apparatuses 100 of the embodiment, the second prism 140 is disposed beside the first prism 130 and located above the frame area 120 of the display device 102. Besides, a part of the light beam L from the area of the display area 110 of the display device 102 that is covered by the first light entering surface 132 (i.e. the light beam L2) sequentially penetrates the first light entering surface 132, is reflected by the reflective refractive surface 134, penetrates the first light exiting surface 136, the gap G, the second light entering surface 142 and the second light exiting surface 146 sequentially, and is transmitted to above the frame area 120. Therefore, the frame area 120 that is originally a non-display area may display images via the light beam L2 that are emitted from second light exiting surface 146 and transmitted to above the frame area 120, so that the display apparatus 100 achieves a borderless display effect. In the embodiment, when the viewer watches the display apparatuses 100 as shown in FIG. 1C, the viewer cannot notice the frames of the display apparatuses 100. Besides, a part of the light beam L from the area of the display area 110 of the display device 102 that is covered by the first light entering surface 132 (i.e. the light beam L3) is totally reflected by the first light exiting surface 136 toward the reflective refractive surface 134, and emitted from the reflective refractive surface 134. Therefore, when the viewer at a side of the first prism 130 watches the display apparatus 100 at a larger viewing angle such as watching the display apparatus 100 in a direction from the reflective refractive surface 134 of the first prism 130 to the frame area 120, the viewer may see the images displayed by the light beam L3 and does not see the frames of the display apparatuses, so as to increase the viewing angle of the displayed image of the display apparatus 100 at the frame area 120.

Figure 2:
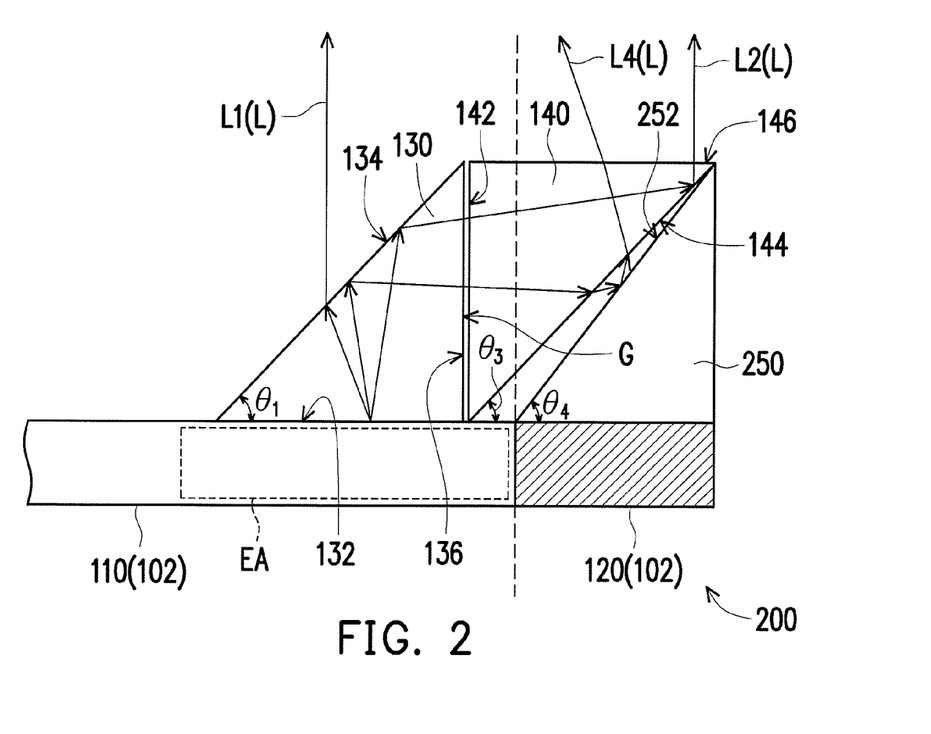
FIG. 2 is a partial cross-sectional view depicting a junction of a display area and a frame area of a display apparatus of another embodiment of the invention.

FIG. 2 is a partial cross-sectional view depicting a junction of a display area and a frame area of a display apparatus of another embodiment of the invention. Referring to FIG. 2, the display apparatus 200 of the embodiment is similar to the display apparatus 100 that is depicted in FIG. 1A to FIG. 1C. The members and the related description of the display apparatus 200 may refer to the display apparatus 100 in FIG. 1A to FIG. 1C, and will not be repeated. The difference between the display apparatus 200 and the display apparatus 100 is that the display apparatus 200 further includes a reflecting element 250 disposed beside the second prism 140. The reflecting element 250 has a reflecting surface 252. An end of the reflecting surface 252 is substantially adjacent to a junction of the display area 110 and the frame area 120, and another end of the reflecting surface 252 is adjacent to an end of the second light exiting surface 146 of the second prism 140 that is away from the display area 110. In addition, in some embodiments, an end of the reflecting surface 252 is located in the display area 110, and another end of reflecting surface 252 is adjacent to an end of the second light exiting surface 146 of the second prism 140 that is away from the display area 110. Alternatively, an end of the reflecting surface 252 may be located in the frame area 120, and another end of reflecting surface 252 is adjacent to the end of the second light exiting surface 146 of the second prism 140 that is away from the display area 110, and the invention is not limited thereto. In the embodiment, the inclined surface 144 of the second prism 140 has an inclined angle $\theta_3$ with respect to the surface of the display area 110 of the display device 102. The reflecting surface 252 of the reflecting element 250 has an inclined angle $\theta_4$ with respect to the surface of the display area 110 of the display device 102. In detail, the inclined angle $\theta_4$ is greater than the inclined angle $\theta_3$. In other words, the inclined degree of the reflecting surface 252 with respect to the display area 110 is greater than the inclined degree of the inclined surface 144 with respect to the display area 110.

In the embodiment, the area of the display area 110 that is covered by the first light entering surface 132 emits a light beam L. In detail, the light beam L includes a light beam L1 and a light beam L2. The light beam L1 sequentially penetrates the first light entering surface 132 and the reflective refractive surface 134 and is refracted to above the display area 110. Besides, the light beam L2 is reflected by the reflective refractive surface 134 toward the first light exiting surface 136 after the light beam L2 penetrates the first light entering surface 132 and enters the first prism 130. Subsequently, the light beam L2 penetrates the first light exiting surface 136, the gap G, and the second light entering surface 142 of the second prism 140 sequentially. The light beam L2 is reflected by the inclined surface 144 to the second light exiting surface 146. In the embodiment, the light beam L further includes a light beam L4. The light beam L4 is reflected by the reflective refractive surface 134 toward the first light exiting surface 136 after the light beam L4 penetrates the first light entering surface 132 and enters the first prism 130. After that, the light beam L4 penetrates the first light exiting surface 136, the gap G, and the second light entering surface 142 of the second prism 140 sequentially, and is refracted at the inclined surface 144 to depart from the second prism 140. Subsequently, the light beam L4 is reflected by the reflecting surface 252 of the reflecting element 250 and refracted by the inclined surface 144 again to enter the second prism 140. The light beam L4 that enters the second prism 140 again is obliquely transmitted upward and emitted from the second light exiting surface 146. In the embodiment, the frame area 120 that is originally a non-display area may display images via the light beam L2 that is emitted from the second light exiting surface 146 and transmitted to above the frame area 120, so that the display apparatus 200 achieves the borderless display effect that is similar to the borderless display effect of the display apparatus 100 of the embodiment in FIG. 1A to FIG. 1C. In addition, the display apparatus 200 includes the reflecting element 250, and the reflecting element 250 has the reflecting surface 252. Therefore, the light beam L4 that is refracted at the inclined surface 144 and depart the second prism 140 may return to the second prism 140 again because of the reflecting element 250, and may be obliquely emitted from the second light exiting surface 146. When the viewer at a side of the first prism 130 watches the display apparatus 200 at a larger viewing angle such as watching the display apparatus 200 in a direction from the reflective refractive surface 134 of the first prism 130 to the frame area 120, the viewer may see the images displayed by the light beam L4 and does not see the frame of the display apparatus 200, so as to increase the viewing angle of the displayed image of the display apparatus 200 at the frame area 120.

In the embodiment, the reflective refractive surface 134 of the first prism 130 of the display apparatus 200 has an inclined angle $\theta_1$ with respect to the surface of the display area 110 of the display device 102. The inclined angle $\theta_1$ is in a range of 10-80 degrees. Preferably, the inclined angle $\theta_1$ is in a range of 30-60 degrees. More preferably, the inclined angle $\theta_1$ is in a range of 35-45 degrees. Besides, when the inclined angle $\theta_1$ is smaller, the viewer from a side of the first prism 130 may see the light beam emitted from the display area 110 with a smaller inclined angle and with a higher brightness. In contrast, when the inclined angle $\theta_1$ is larger, the viewer from a side of the first prism 130 may see the light beam emitted from the display area 110 with a larger inclined angle and with a lower brightness. Specifically, the light beam emitted from the display area 110 with a smaller inclined angle as mentioned above means that the angle between the light beam emitted from the display area 110 and the normal line that is perpendicular to the surface of the display area 110 is smaller, and the light beam emitted from the display area 110 with a larger inclined angle as mentioned above means that the angle between the light beam emitted from the display area 110 and the normal line that is perpendicular to the surface of the display area 110 is larger. For example, when the inclined angle $\theta_1$ is 40 degrees, the inclined angle of the light beam emitted from the display area 110 that the viewer from a side of the first prism 130 may see is smaller than the inclined angle of the light beam emitted from the display area 110 that the viewer from a side of the first prism 130 may see when the inclined angle $\theta_1$ is 45 degrees. In addition, when the inclined angle $\theta_1$ is 40 degrees, the brightness of the light beam emitted from the display area 110 that the viewer from a side of the first prism 130 may see is higher than the brightness of the light beam emitted from the display area 110 that the viewer from a side of the first prism 130 may see when the inclined angle $\theta_1$ is 45 degrees.

Figure 3:
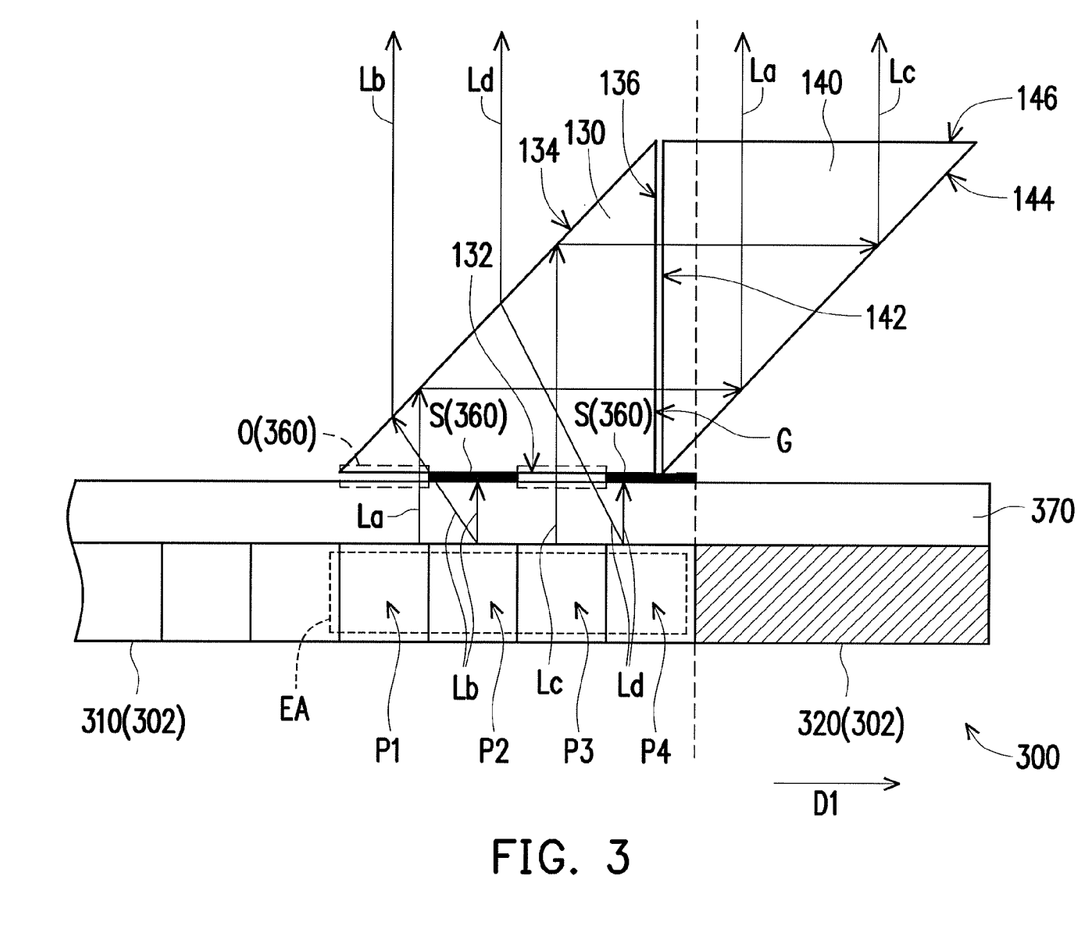
FIG. 3 is a partial cross-sectional view depicting a junction of a display area and a frame area of a display apparatus of another embodiment of the invention.

FIG. 3 is a partial cross-sectional view depicting a junction of a display area and a frame area of a display apparatus of another embodiment of the invention. Referring to FIG. 3, the display apparatus 300 of the embodiment is similar to the display apparatus 100 that is depicted in FIG. 1A to FIG. 1C. The members and the related description of the display apparatus 300 may refer to the display apparatus 100 in FIG. 1A to FIG. 1C, and will not be repeated. The display apparatus 300 includes a display device 302. The display device 302 has a display area 310 and a frame area 320 surrounding the display area 310. The difference between the display apparatus 300 and the display apparatus 100 is that the display apparatus 300 further includes a parallax barrier 360 disposed between the edge area EA of the display area 310 and the first light entering surface 132. In the embodiment, the display area 310 includes a plurality of pixels, and a part of the pixels includes a pixel P1, a pixel P2, a pixel P3, and a pixel P4 which are sequentially arranged along a direction D1. At least the pixel P1, the pixel P2, the pixel P3, and the pixel P4 are located in the edge area EA. The direction D1 in the embodiment is defined as a direction from the display area 310 to the frame area 320. In detail, the parallax barrier 360 covers the edge area EA and has a plurality of light-shielding parts S that shield a part of a plurality of pixels in the edge area EA, such as the pixel P2 and the pixel P4. Besides, the parallax barrier 360 has a plurality of light-transmitting parts O that expose the other part of the pixels in the edge area EA, such as the pixel P1 and the pixel P3. In the embodiment, a transparent plate 370 having an appropriate thickness may be optionally disposed between the display device 302 and the parallax barrier 360, so as to adjust the distance between the parallax barrier 360 and the display device 302.

In the embodiment, the light beam emitted by the part of the pixels that are shielded by the light-shielding parts S of the parallax barrier 360 are obliquely transmitted to the first light entering surface 132 and the reflective refractive surface 134 sequentially via the light-transmitting parts O and refracted to above the display area 110 by the reflective refractive surface 134. In detail, the pixel P2 and the pixel P4 that are shielded by the light-shielding parts S of the parallax barrier 360 emit the light beam Lb and the light beam Ld, respectively. A part of the light beam Lb and a part of the light beam Ld are shielded by the light-shielding parts S of the parallax barrier 360, and the other part of the light beam Lb and the other part of the light beam Ld are obliquely transmitted through the light-transmitting parts O to the first light entering surface 132 and the reflective refractive surface 134 sequentially, and refracted to above the display area 110 by the reflective refractive surface 134. Besides, in the embodiment, the light beams emitted by the other part of the pixels sequentially penetrate the first light entering surface 132 via the light-transmitting parts O, are reflected by the reflective refractive surface 134, penetrate the gap G and are emitted from the second light entering surface 142. In detail, the pixel P1 and the pixel P3 that are not shielded by the light-shielding parts S of the parallax barrier 360 emit the light beam La and the light beam Lc, respectively. The light beam La and the light beam Lc sequentially penetrate the first light entering surface 132 via the light-transmitting parts O, are reflected by the reflective refractive surface 134, penetrate the gap G and are emitted from the second light entering surface 142.

In the embodiment, the viewer located above the display apparatus 300 can see the light beam Lb from the pixel P2, the light beam Ld from the pixel P4, the light beam La from the pixel P1, and the light beam Lc from the pixel P3 sequentially along the direction D1. In detail, the light beam Lb from the pixel P2 and the light beam Ld from the pixel P4 are displayed by the display area 310, and the light beam La from the pixel P1 and the light beam Lc from the pixel P3 are displayed by the frame area 320. In other words, based on the design of the pixels located in the edge area EA and based on shielding the pixels by the parallax barrier 360, the display apparatus 300 may display different images on the display area 310 and the frame area 320.

Figure 4A:
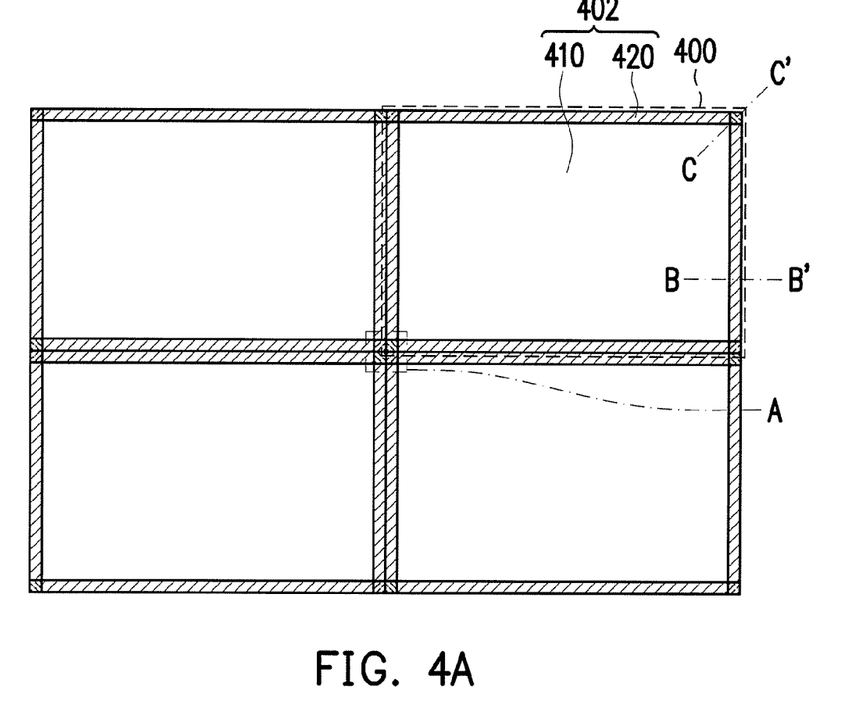
FIG. 4A is a schematic top view depicting a plurality of display apparatuses being spliced together according to another embodiment of the invention.
Figure 4B:
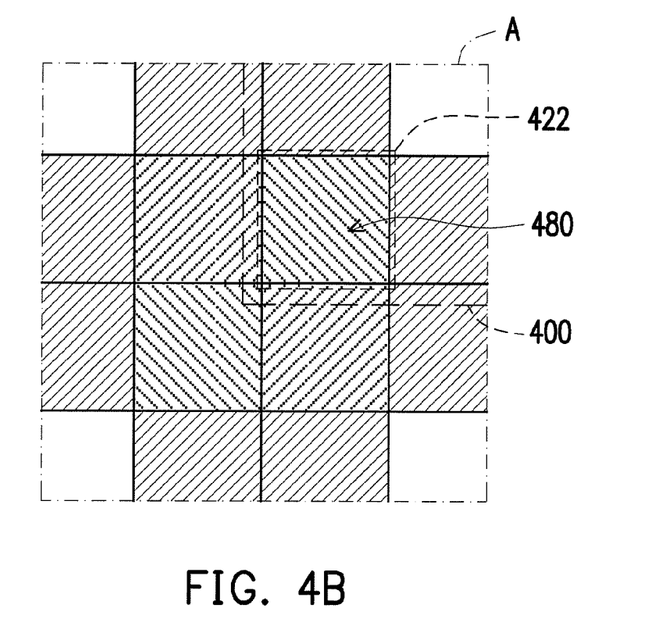
FIG. 4B is an enlarged schematic view depicting an area A of the display apparatus of the embodiment in FIG. 4A.
Figure 4C:
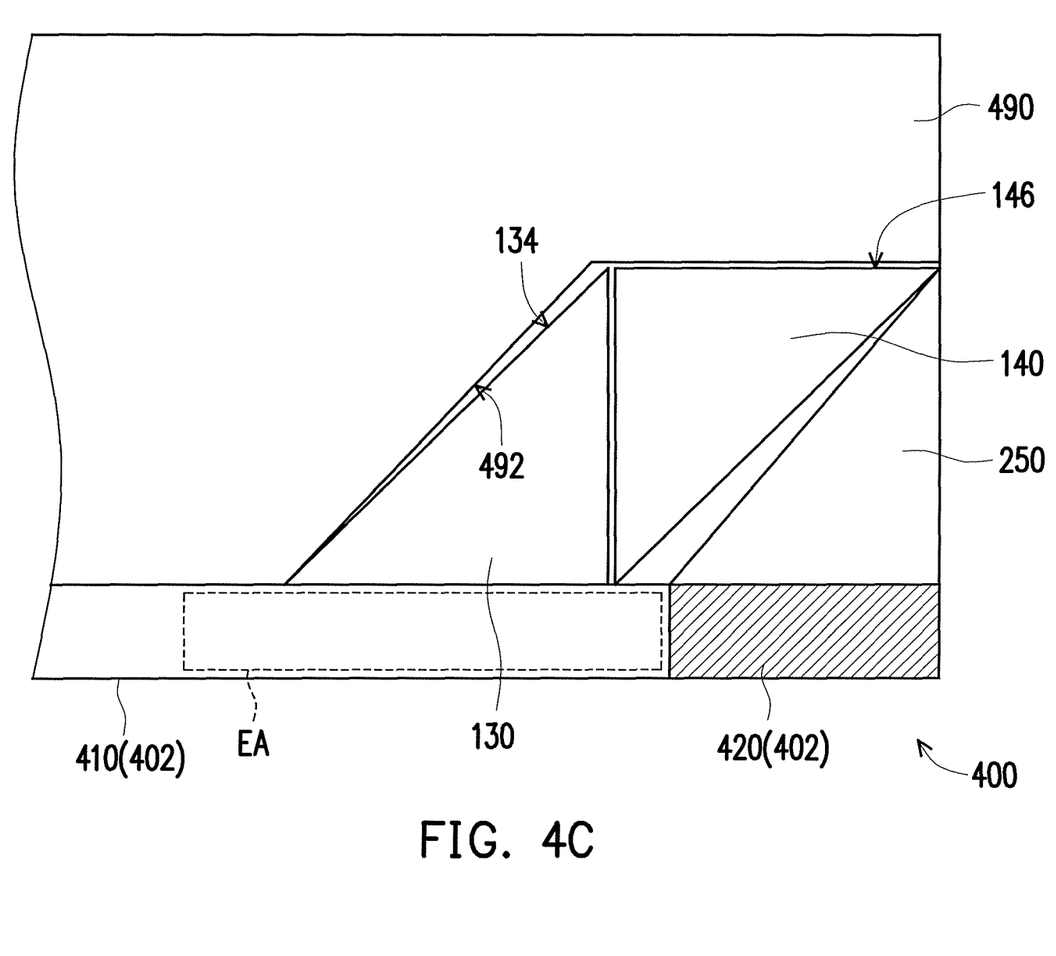
FIG. 4C is a partial cross-sectional view depicting a junction of a display area and a frame area (along a line B-B') of the display apparatus of the embodiment in FIG. 4A.
Figure 4D:
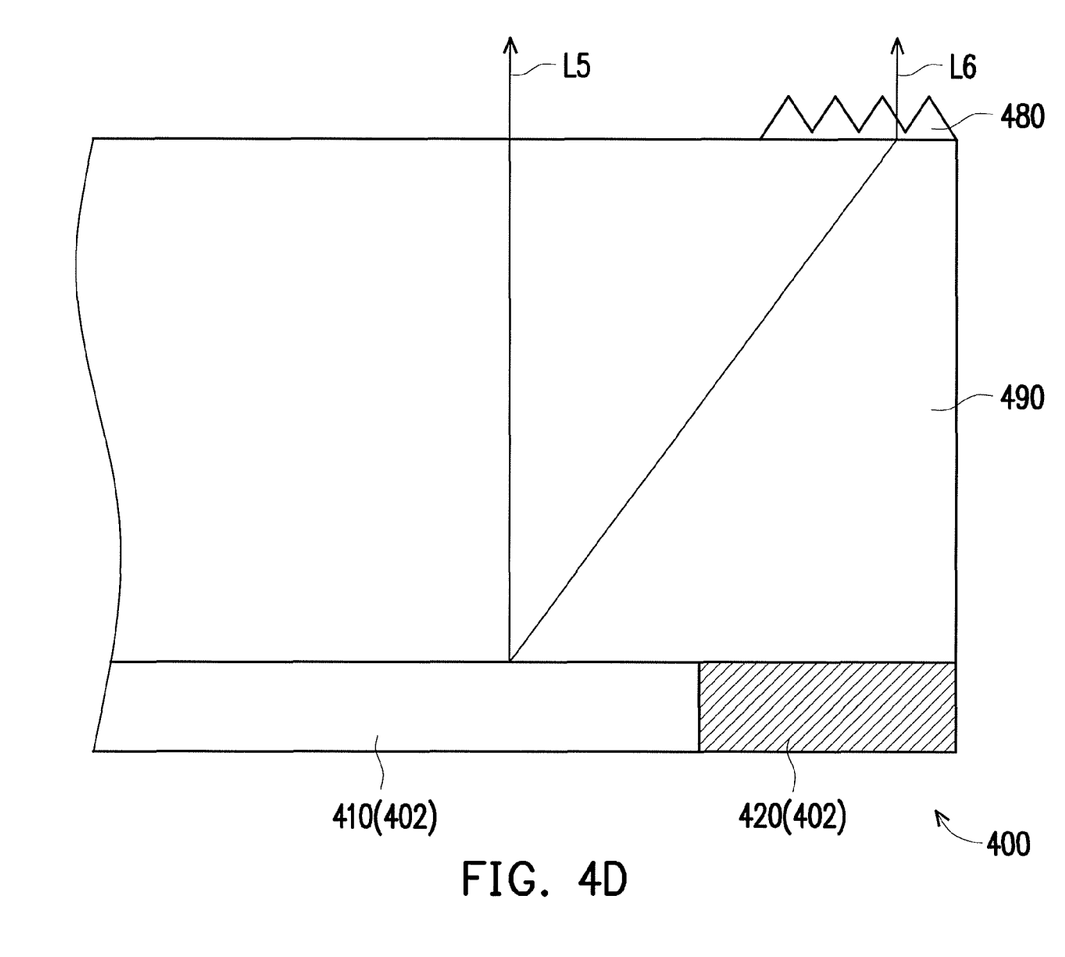
FIG. 4D is a partial cross-sectional view depicting the junction at a corner of the display area and the frame area (along a line C-C') of the display apparatus of the embodiment in FIG. 4A.

FIG. 4A is a schematic top view depicting a plurality of display apparatuses being spliced together according to another embodiment of the invention, FIG. 4B is an enlarged schematic view depicting an area A of the display apparatus of the embodiment in FIG. 4A, FIG. 4C is a partial cross-sectional view depicting a junction of a display area and a frame area (along a line B-B') of the display apparatus of the embodiment in FIG. 4A, FIG. 4D is a partial cross-sectional view depicting the junction at a corner of the display area and the frame area (along a line C-C') of the display apparatus of the embodiment in FIG. 4A. Referring to FIG. 4A, in the embodiment, a plurality of the display apparatuses 400 are spliced by the splicing method that is similar to the splicing method of the embodiment in FIG. 1C. The display apparatus 400 is similar to the display apparatus 200 of the embodiment in FIG. 2. The members and the related description of the display apparatus 400 may refer to the display apparatus 200 of the embodiment in FIG. 2, and will not be repeated. In the embodiment, the display apparatus 400 includes a display device 402, and the display device 402 has a display area 410 and a frame area 420 surrounding the display area 410. In detail, referring to FIG. 4A and FIG. 4C, the display apparatus 400 further includes a transparent plate 490 disposed on the display device 402. The transparent plate 490 covers the first prism 130 and the second prism 140. In the embodiment, the transparent plate 490 has a third light entering surface 492. The third light entering surface 492 faces the reflective refractive surface 134 of the first prism 130, and the third light entering surface 492 leans against the reflective refractive surface 134. The light beam (not shown) from the display area 410 that is refracted to above the display area 410 by the reflective refractive surface 134 enters the transparent plate 490 through the third light entering surface 492 and is transmitted upward. Besides, the light beam (not shown) from the display area 410 that is emitted from the second light exiting surface 146 is also transmitted upward through the transparent plate 490.

Subsequently, referring to FIG. 4A, FIG. 4B, and FIG. 4D, in the embodiment, the frame area 420 of the display apparatus 400 has a corner 422 at the corner of the display apparatus 400 (as shown in FIG. 4B). The display apparatus 400 further includes a prism set 480 disposed above a corner 422 of the frame area 420. In detail, referring to FIGS. 4B and 4D, a light beam L5 and a light beam L6 are emitted from the pixels of the display area 410 that are adjacent to the corner 422. The light beam L5 is emitted vertically to achieve the display effect of the display area 410. Besides, the light beam L6 that is not emitted vertically may be vertically transmitted via the prism set 480 so that the corner 422 of the frame area 420 may display images.

In the embodiment, the frame area 420 that is originally a non-display area may display images via the light beam that is emitted from the second light exiting surface 146 and transmitted to above the frame area 420, so that the display apparatus 400 achieves the borderless display effect that is similar to the borderless display effect of the display apparatus 100 of the embodiment in FIG. 1A to FIG. 1C. In addition, because the display apparatus 400 includes the reflecting element 250, the viewing angle of the displayed images at the frame area 420 of the display apparatus 400 is increased. Moreover, the transparent plate 490 of the display apparatus 400 may protect the first prism 130 and the second prism 140. Besides, the light beam L6 that is not emitted vertically may be vertically transmitted via the prism set 480, so that the corner 422 of the frame area 420 may display images.

Figure 5:
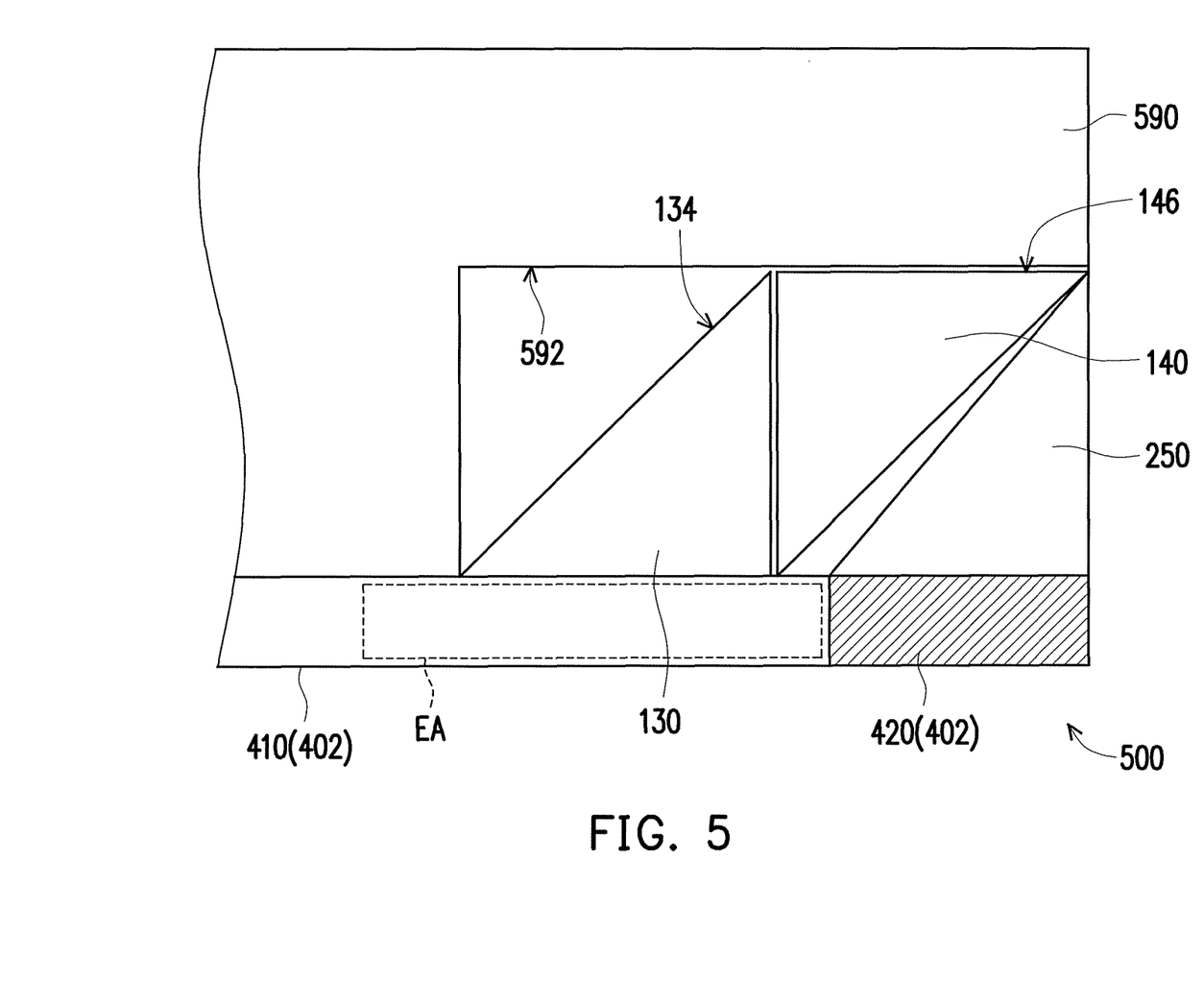
FIG. 5 is a partial cross-sectional view depicting a junction of a display area and a frame area of a display apparatus of another embodiment of the invention.

FIG. 5 is a partial cross-sectional view depicting a junction of a display area and a frame area of a display apparatus of another embodiment of the invention. Referring to FIG. 5, the display apparatus 500 of the embodiment is similar to the display apparatus 400 that is depicted in FIG. 4A to FIG. 4D. The members and the related description of the display apparatus 500 may refer to the display apparatus 400 of the embodiment in FIG. 4A to FIG. 4D, and will not be repeated. The difference between the display apparatus 500 and the display apparatus 400 is that the third light entering surface 592 of the transparent plate 590 of the display apparatus 500 is substantially parallel to the surface of the display device 402. In detail, the light beam from the display area 410 that is refracted by the reflective refractive surface 134 to above the display area 410 (not shown) enters the transparent plate 590 via the third light entering surface 592 and is transmitted upward. The emitting direction of the light beam is not changed due to refraction before and after entering the third light entering surface 592, so that the light beam is maintained to be transmitted upward. In the embodiment, the display apparatus 500 may achieve the borderless display effect that is similar to the borderless display effect of the display apparatus 400 of the embodiment in FIGS. 4A-4D, and the emitting direction of the light beam emitted from the first prism 130 is not changed because of the transparent plate 590, so as to achieve a better display effect.

In summary, the display apparatus of the embodiments of the invention has at least one of the following advantages. The second prism is disposed beside the first prism and located above the frame area of the display device. Besides, the part of the light beam from the area of the display area that is covered by the first light entering surface sequentially penetrates the first light entering surface, is reflected by the reflective refractive surface, penetrates the first light exiting surface, the gap, the second light entering surface and the second light exiting surface sequentially, and is transmitted to above the frame area. Therefore, the display apparatus can achieve a borderless display effect. Moreover, because a design having the inclined angle of the first prism, the gap between the first prism and the second prism, or the reflecting element, when the viewer at a side of the first prism watches the display apparatus at a larger viewing angle, the viewer still sees the displayed image and does not see the frame of the display apparatus, so as to improve the display effect of the displayed image at the large viewing angle.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
    a display device, having a display area and a frame area surrounding the display area;
    a first prism, disposed on an edge area of the display area, and having a first light entering surface facing the display area, a reflective refractive surface inclined with respect to the display area, a first light exiting surface connecting the first light entering surface and the reflective refractive surface; and
    a second prism, disposed beside the first prism, and located above the frame area, the second prism having a second light entering surface facing the first light exiting surface and a second light exiting surface located above and facing away from the frame area, wherein the first light exiting surface and the second light entering surface have a gap therebetween, a part of light beam from an area of the display area covered by the first light entering surface penetrates the first light entering surface and is sequentially refracted by the reflective refractive surface to above the display area, and another part of the light beam from the area of the display area covered by the first light entering surface penetrates the first light entering surface, is reflected by the reflective refractive surface, penetrates the first light exiting surface, the gap, the second light entering surface and the second light exiting surface sequentially, and is transmitted to above the frame area.

2. The display apparatus of claim 1, wherein the second prism further has an inclined surface inclined with respect to the display area, the inclined surface connects the second light entering surface with the second light exiting surface, and the inclined surface reflects at least a part of the another part of the light beam from the second light entering surface to the second light exiting surface.

3. The display apparatus of claim 2, wherein the reflective refractive surface totally reflects the another part of the light beam from the first light entering surface to the first light exiting surface, and the inclined surface totally reflects the another part of the light beam from the second light entering surface to the second light exiting surface.

4. The display apparatus of claim 2, wherein an inclined angle of the inclined surface with respect to the display area is in a range of 10-80 degrees.

5. The display apparatus of claim 1, wherein the gap is located in the display area, or aligned with a junction of the display area and the frame area.

6. The display apparatus of claim 1, further comprising a reflecting element having a reflecting surface, wherein an end of the reflecting surface is substantially adjacent to a junction of the display area and the frame area, and another end of the reflecting surface is adjacent to an end of the second light exiting surface away from the display area.

7. The display apparatus of claim 6, wherein the second prism further has an inclined surface inclined with respect to the display area, the inclined surface connects the second light entering surface with the second light exiting surface, and an inclined degree of the reflecting surface with respect to the display area is greater than an inclined degree of the inclined surface with respect to the display area.

8. The display apparatus of claim 1, wherein an inclined angle of the reflective refractive surface with respect to the display area is in a range of 10-80 degrees.

9. The display apparatus of claim 1, further comprising a parallax barrier disposed between the edge area of the display area and the first light entering surface, wherein the parallax barrier covers the edge area, has a plurality of light-shielding parts shielding a part of a plurality of pixels in the edge area, and has a plurality of light-transmitting parts exposing another part of the plurality of pixels in the edge area, light beams emitted by the part of the pixels shielded by the light-shielding parts are obliquely transmitted to the first light entering surface and the reflective refractive surface sequentially via the light-transmitting parts and refracted to above the display area by the reflective refractive surface, and light beams emitted by the another part of the pixels sequentially penetrate the first light entering surface via the light-transmitting parts, are reflected by the reflective refractive surface, penetrate the gap and are emitted from the second light entering surface.

10. The display apparatus of claim 1, wherein the gap is an air gap, a gas gap, or a vacuum gap.

11. The display apparatus of claim 1, further comprising a prism set disposed above a corner of the frame area.

12. The display apparatus of claim 1, further comprising a transparent plate disposed on the display device, wherein the transparent plate covers the first prism and the second prism.

13. The display apparatus of claim 12, wherein the transparent plate has a third light entering surface, and the third light entering surface is substantially parallel to a surface of the display device.

14. A display apparatus, comprising:
a display device, having a display area and a frame area surrounding the display area;
a first prism, disposed on an edge area of the display area, and having a first light entering surface facing the display area, a reflective refractive surface inclined with respect to the display area, a first light exiting surface connecting the first light entering surface and the reflective refractive surface; and
a second prism, disposed beside the first prism, and located above the frame area, the second prism having a second light entering surface facing the first light exiting surface, a second light exiting surface located above and facing away from the frame area, and an inclined surface connecting the second light entering surface and the second light exiting surface, wherein the first light exiting surface and the second light entering surface have a gap therebetween and face each other.

15. The display apparatus of claim 14, wherein an inclined angle of the inclined surface with respect to the display area is in a range of 10-80 degrees.

16. The display apparatus of claim 14, wherein the gap is located in the display area, or aligned with a junction of the display area and the frame area.

17. The display apparatus of claim 14, further comprising a reflecting element having a reflecting surface, wherein an end of the reflecting surface is substantially adjacent to a junction of the display area and the frame area, and another end of the reflecting surface is adjacent to an end of the second light exiting surface away from the display area.

18. The display apparatus of claim 17, wherein an inclined degree of the reflecting surface with respect to the display area is greater than an inclined degree of the inclined surface with respect to the display area.

19. The display apparatus of claim 14, wherein an inclined angle of the reflective refractive surface with respect to the display area is in a range of 10-80 degrees.

20. The display apparatus of claim 14, further comprising a parallax barrier disposed between the edge area of the display area and the first light entering surface, wherein the parallax barrier covers the edge area, has a plurality of light-shielding parts shielding a part of a plurality of pixels in the edge area, and has a plurality of light-transmitting parts exposing another part of the plurality of pixels in the edge area, light beams emitted by the part of the pixels shielded by the light-shielding parts are obliquely transmitted to the first light entering surface and the reflective refractive surface sequentially via the light-transmitting parts and refracted to above the display area by the reflective refractive surface, and light beams emitted by the another part of the pixels sequentially penetrate the first light entering surface via the light-transmitting parts, are reflected by the reflective refractive surface, penetrate the gap, are reflected by the inclined surface and are emitted from the second light exiting surface.

21. The display apparatus of claim 14, wherein the gap is an air gap, a gas gap, or a vacuum gap.

22. The display apparatus of claim 14, further comprising a prism set disposed above a corner of the frame area.

23. The display apparatus of claim 14, further comprising a transparent plate disposed on the display device, wherein the transparent plate covers the first prism and the second prism.

24. The display apparatus of claim 23, wherein the transparent plate has a third light entering surface, and the third light entering surface is substantially parallel to a surface of the display device.

* * * * *